United States Patent [19]

Ahlen et al.

[11] Patent Number: 4,480,503
[45] Date of Patent: Nov. 6, 1984

[54] MULTISTAGE TRANSMISSION FOR MOTOR VEHICLES

[75] Inventors: Karl-Gustav Ahlen; Per-Olof Bergstrom, both of Stockholm, Sweden

[73] Assignee: S.R.M. Hydromekanik Aktiebolag, Stockholm, Sweden

[21] Appl. No.: 225,428

[22] Filed: Jan. 15, 1981

Related U.S. Application Data

[63] Continuation of Ser. No. 843,520, Oct. 19, 1977, abandoned.

[30] Foreign Application Priority Data

Aug. 25, 1977 [GB] United Kingdom ............... 35697/77

[51] Int. Cl.³ ............................................. F16H 57/10
[52] U.S. Cl. ........................................ 74/766; 74/768; 74/760; 74/761
[58] Field of Search ................... 74/760, 761, 766, 768

[56] References Cited

U.S. PATENT DOCUMENTS

| | | | |
|---|---|---|---|
| 1,256,371 | 2/1918 | Rowledge | 74/761 |
| 2,675,678 | 4/1954 | English | 74/758 |
| 2,894,415 | 7/1959 | Miller | 74/732 |
| 2,926,543 | 3/1960 | Holdeman et al. | 74/740 |
| 3,115,793 | 12/1963 | Hobbs | 74/753 |
| 3,188,885 | 6/1965 | Fisher | 74/761 |
| 3,444,761 | 5/1969 | Wickman | 74/740 |
| 3,613,848 | 10/1971 | Reiff | 192/70.28 |
| 3,802,294 | 4/1974 | Mirl | 74/740 |
| 3,857,303 | 12/1974 | Mouttet | 74/761 |
| 3,862,581 | 1/1975 | O'Malley | 74/763 |
| 3,941,013 | 3/1976 | Miller | 74/740 |
| 4,019,406 | 4/1977 | Herr | 74/753 |
| 4,142,425 | 3/1979 | Ahlen et al. | 74/760 |
| 4,214,489 | 7/1980 | Ahlen et al. | 74/760 |

FOREIGN PATENT DOCUMENTS

| | | | |
|---|---|---|---|
| 517242 | 11/1928 | Fed. Rep. of Germany | 74/760 |
| 1062429 | 12/1953 | France | 74/761 |
| 905382 | 7/1962 | France | 74/766 |
| 510500 | 7/1939 | United Kingdom | 74/768 |

Primary Examiner—Allan D. Herrmann
Assistant Examiner—D. Wright
Attorney, Agent, or Firm—Larson and Taylor

[57] ABSTRACT

A multi-speed transmission comprising either two or three planetary gear sets arranged in a series with the output from the first and second sets of the series operatively connected to the inputs of the second and third sets of the series, respectively. In all three sets the planetary gear carrier is the output member thereof. All three sets have a direct drive clutch for operatively connecting their respective input and output members. One of the planetary gear sets has at least three different gearing diameters on its respective pinions and the input is a ring gear operatively engaged with the largest diameter gearing. Another planetary gear set is a range gear having an input sun gear and a plurality of pinions having a gearing which provides a speed reduction ratio greater than the highest speed reduction ratio of the previously mentioned planetary gear set. Another planetary gear set has an input ring gear and a plurality of planetary pinions having at least two gearing diameters, the speed reduction ratio being intermediate between the speed reduction ratios of the first mentioned planetary gear set.

24 Claims, 8 Drawing Figures

MULTISTAGE TRANSMISSION FOR MOTOR VEHICLES

This is a continuation of application Ser. No. 843,520 filed Oct. 19, 1977 now abandoned.

This invention relates to a multistage transmission for motor vehicles, comprising two planet gears arranged in series, in each of which the input member is a central wheel meshing with the planet wheels and the output member is the planet wheel carrier, and at least two friction disc clutches which can be engaged and released are provided for establishing direct transmission.

Whereas passenger vehicles in particular, which are motor vehicles with a high specific performance, only require a direct transmission which is generally sufficient for up to the maximum speeds and two or three reduction gears for starting, for driving at low speeds, especially in town traffic, and for climbing hills, and the brake for travelling downhill, those vehicles which are used for low specific performance, in which high acceleration and high final velocities are less important than high traction, require a large number of finely graded reduction gears so that the engine can always operate at its optimum torque and minimum fuel consumption. Change speed gears suitable for this purpose are generally designed as a stationary transmission with transmission shaft and they reach considerable dimensions owing to the large number of pairs of gear wheels required.

The use of planet gears is also known, especially in combination with hydrodynamic torque converters. However, the known multistage transmissions with planet wheels are even more complicated in construction than the corresponding stationary transmissions and the losses which are not dependent on load are so high that the use of multistage planet gears has not become widely established.

The disadvantages mentioned above also apply for the most part to a known multistage transmission of the kind described above (U.S. Pat. No. 2,894,415) in which four reduced speed forward gears, one direct forward gear and one reduced speed reverse gear are obtained by means of two planet gears arranged one behind the other in series with a hydrodynamic torque converter. The use of a central wheel of the planet gear as its input member and of the planet wheel carrier as its output member provides the conditions necessary for reducing the ventilation losses since the overall differential speeds of the transmission parts are thereby kept low when the transmission is switched to reducing gears. However, the front planet wheel gear requires a second input shaft for establishing the direct transmission through the first direct clutch, by-passing the torque converter, and two shafts are also required between the two planet gears, one of which shafts can be separated by the second direct clutch. In addition, both planet gears have intermediate gear wheels between the planet wheels as well as an internally geared ring wheel, and the ring wheels, which are designed to be braked, are associated with considerable losses when disengaged.

It is an object of the present invention to provide a multistage transmission designed as planet gear transmission, which largely avoids the structural complications of the known multistage transmissions with planet wheels and ensures uniform grading between the forward speed reductions and direct transmission while providing more than five forward gears, and in which the losses which are independent of load as well as those which are dependent on load are substantially lower than in the known multistage transmissions, so that such a transmission can be used in a wide variety of driving mechanisms for motor vehicles.

To solve this problem according to the invention, the first planet wheel gear has at least two gearings of different diameter, each of which meshes with an externally geared central wheel which can be braked, and the input member is formed by an internally geared central wheel which meshes with the gearing of largest diameter; moreover, in addition to the central wheel which forms the input member, the second planet gear has another central wheel which can be braked and which is toothed in the opposite direction to the central wheel which forms the input member, and each planet gear is associated with one of the friction clutches to connect the planet wheel carrier to a central wheel by friction, and all the brakes are friction disc brakes and operated by servo motors fixed to the housing.

The use according to the invention of a first planet gear which has planet wheels with at least two gearings of differing diameters each meshing with an externally geared central wheel which can be braked selectively already provides a uniform grading of speeds with half the number of gears which are increased to the required number by the second planet gear. Additional input and connecting shafts are eliminated by directly associating each planet gear with one of its friction clutches. This considerably simplifies the design and reduces the losses, which are even further reduced by the fact that all the brakes of the central wheels are friction disc brakes operated by servo motors fixed to the housing. The friction clutches are preferably also operated by servo motors of the housing by way of axial thrust bearings.

The transmission according to the invention can be very simply equipped with a reversing gear by providing the first planet gear with an additional internally geared central wheel which meshes with the planet wheel gearing of smallest diameter and which can be braked for reversing.

According to one advantageous embodiment of the invention, the losses can be even further reduced if all the central wheels are freely adjustable in relation to their intermeshing planet wheel gearings while in rotation, the brakes of the externally geared central wheels being then arranged at a considerable axial distance from the gearings of these wheels while the externally geared central wheels are radially supported in axial proximity to their brakes. These measures substantially reduce the losses at the points of action of the teeth due to the elimination of radial forces between the teeth; this contributes to a considerable reduction in the total losses.

According to another advantageous feature of the invention by which the losses can be reduced, the friction discs of one half of each brake or clutch are made of steel with a surface which has a sinusoidal undulation of small amplitude in the circumferential direction while the friction discs of the other half of each brake or clutch is plane and lined with sintered metal, the friction discs being preferably mounted by means of multi-groove connections so that they are not rotatable but axially displaceable on or in their hubs, and the internal hubs of the brakes and clutches, which rotate when disengaged, are provided with radial air channels for carrying a stream of air between the friction discs, and the friction discs which are held in the external hubs have perforations formed radially outside their zone of engagement for returning the air stream. By virtue of this arrangement, the friction discs are freely adjustable when the brake or clutch is disengaged so that the introduction of large quantities of lubricating oil is unnecessary and instead of the considerable losses due to liquid friction, especially at high speeds of rotation of the internal hubs of the brakes and clutches, only the negligible losses of air suspensions now occur.

In order that metal contact of the friction discs will also be avoided at low speeds of rotation of the internal hubs, at which the air stream produced by the measures described above is relatively ineffective, small quantities of oil in the form of a mist may advantageously be introduced between the friction discs by making one of the central shafts extending through the planet transmission a hollow shaft and connecting it to a source of pressure oil and by providing the transmission shafts as well as the surrounding hubs of the externally geared central wheels with radial distributor apertures for supplying small quantities of lubricating oil not only to the brakes and clutches but also the bearings and teeth of the planet wheels.

There are two methods by which the basic number of gear stages provided by the first planet gear can be doubled by the second planet gear. According to a first embodiment, the planet wheels of the second planet gear of differing diameters have a double set of teeth, and the input member of this planet gear is formed by an internally geared central wheel which meshes with the planet wheel gearings of smaller diameter while the other central wheel, which can be braked, meshes with the planet wheel gearings of larger diameter. This means that when the second planet gear is switched to reduction transmission by separation of the associated direct clutch and braking of the other central wheel, it causes intermediate stages between the reduction stages of the first planet gear to be switched on and hence functions as a so-called split gear. In such a case, the friction clutch of the second planet gear is preferably arranged between the central wheel which can be braked and the planet wheel carrier.

Doubling of the basic number of stages provided by the first plane gear is also achieved if the input member of the second planet gear is an externally geared central wheel while that central wheel of this planet gear which can be braked is internally geared and meshes with the same gearing as the externally geared central wheel. With this arrangement, when the direct clutch of the second planet gear is released and the internally geared central wheel is braked, the said second planet gear provides a second range of speed reduction below the range which can be switched on by the first planet gear and therefore functions as a so-called range gear. According to another constructional feature, in order to be able to switch to reversing with high reduction ratio in such a range gear transmission, the planet wheels of the second planet gear have a double set of gearings with differing diameters; that central wheel which forms the input and that central wheel which can be braked mesh with the gearing of larger diameter while another internally geared central wheel which can be braked is connected to the gearings of smaller diameter by way of intermediate gear wheels which are mounted in the planet carrier.

It will be obvious that by arranging the two planet gears one behind the other, it is possible to obtain six or eight uniformly graded forward gears, including the direct transmission, depending on whether the planet wheels of the first gear have two or three gearings of differing diameters. In some cases, for example in vehicles for military use or in heavy, long-distance trucks, it may be desirable to have an even larger number of switching stages with up to twelve or sixteen gears with very small steps between the individual gears. On the basic principle of the invention of doubling the number of gear stages in the second planet gear, this would necessitate the use of planet wheels with even more than three gearings in the first planet gear. The constructional difficulties which this would entail are solved according to a special feature of the invention by providing a total of three planet gears in series, in which the second gear is constructed as a split gear as described above and the third gear as a range gear.

The invention will now be described in more detail with reference to three examples illustrated in the accompanying drawing together with their characteristic operating diagrams.

Figure 1:
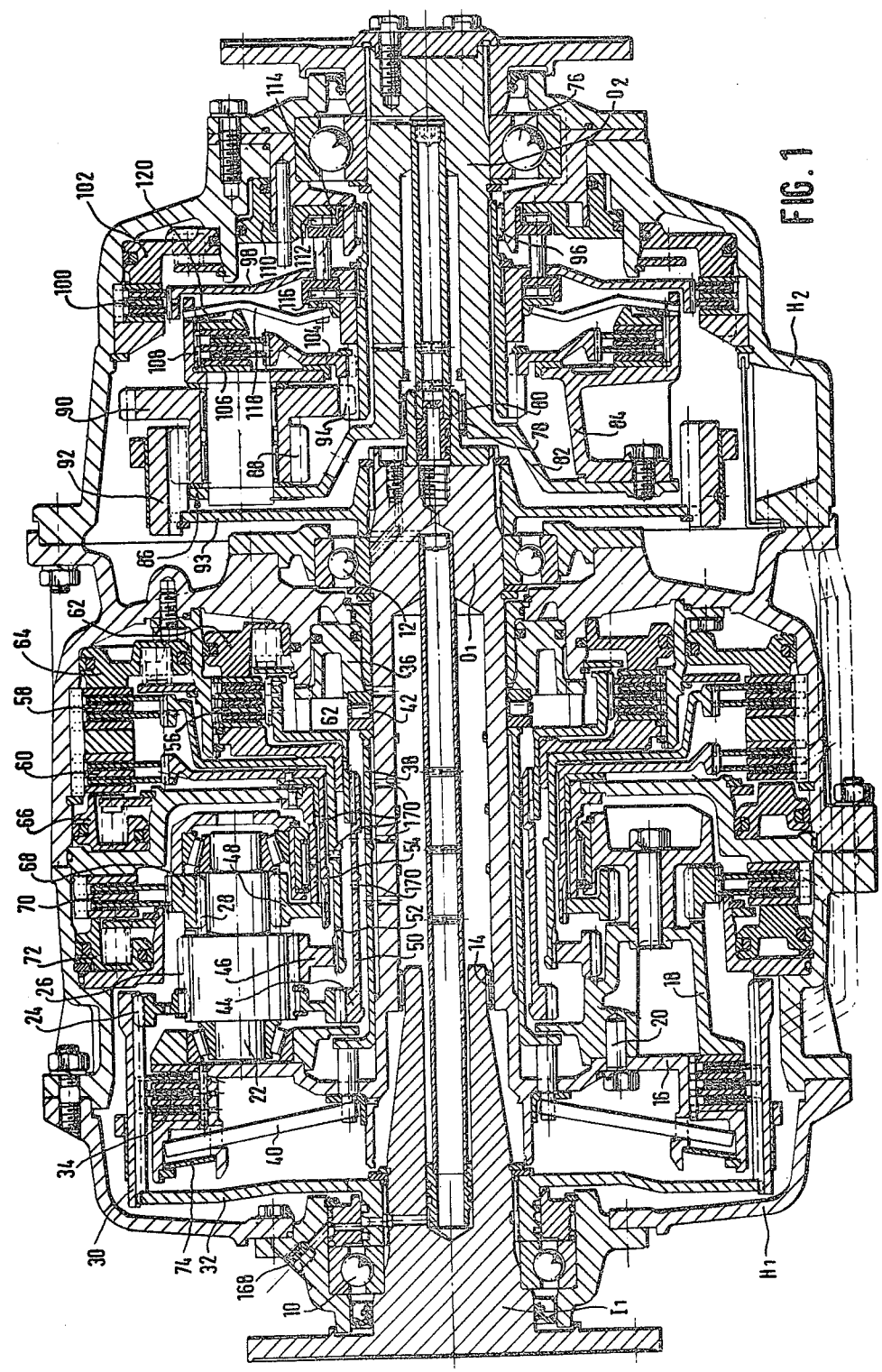
FIG. 1 is a longitudinal section through a first multistage transmission according to the invention having two planet gears in the form of split gears for producing eight forward gear speeds.
Figure 3:
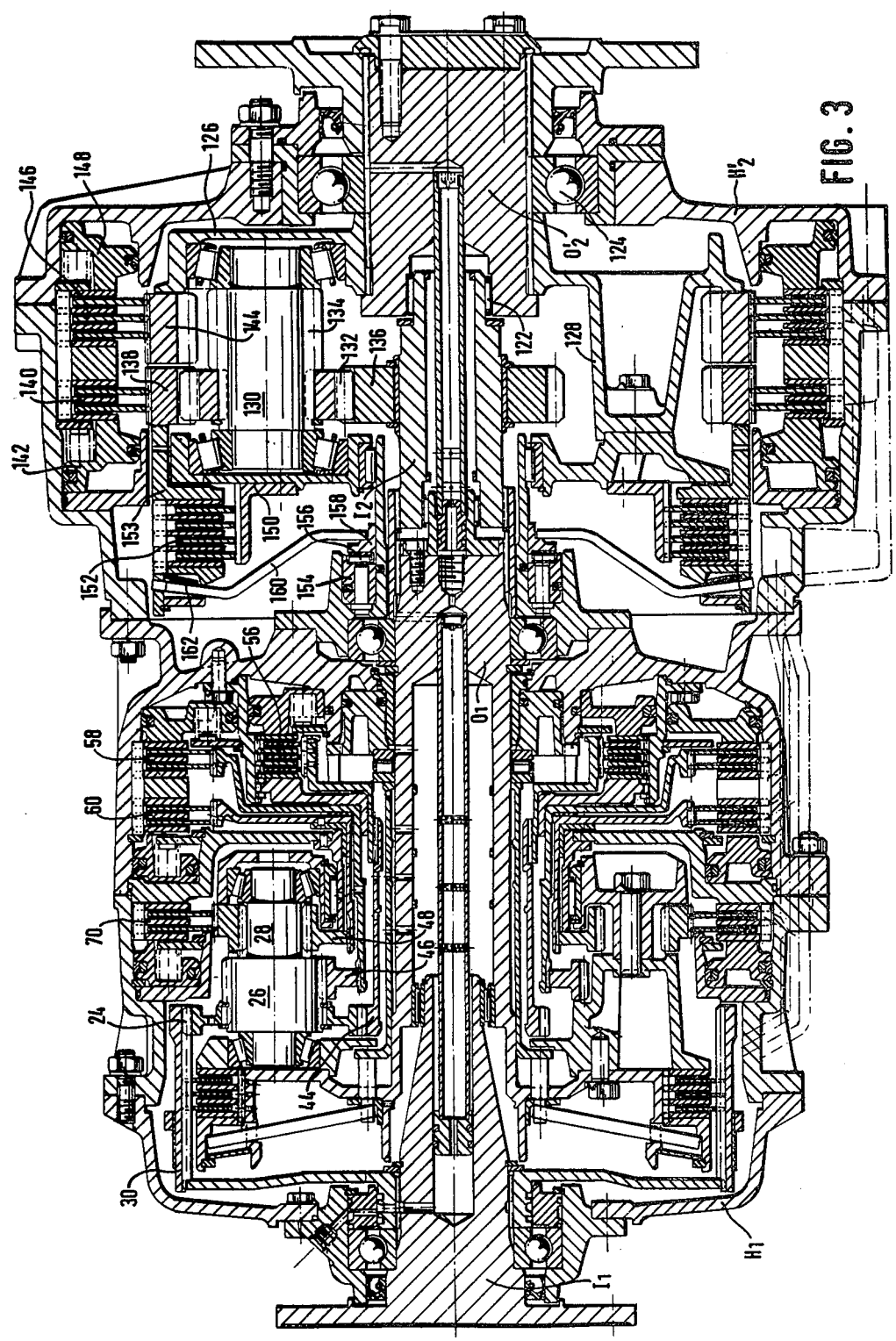
FIG. 3 is a longitudinal section through another embodiment of the multistage transmission according to the invention, again for eight forward gear ratios, in which the second planet gear is constructed as a range gear for providing a coarser gradation of gear stages but with much higher reduction ratios in the lower gears.
Figure 5:
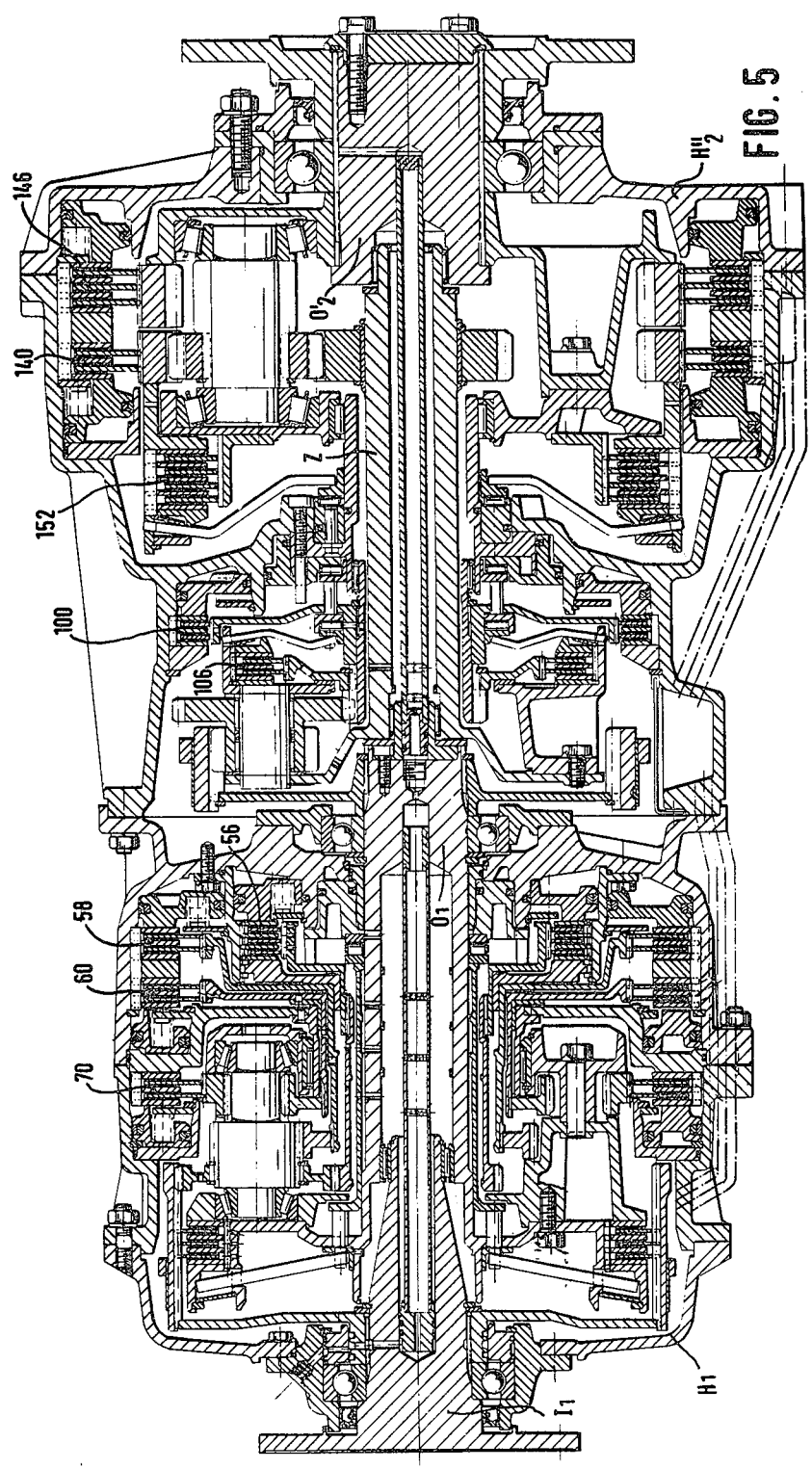
FIG. 5 is a longitudinal section through yet another embodiment of the multistage transmission according to the invention providing a total of sixteen forward gears, using a split gear as the second planet gear and a range gear as the third planet gear.

A comparison between FIGS. 1, 3 and 5 shows that in all three embodiments of the multistage transmission according to the invention, the first planet gears are identical, the second and third planet gear of FIG. 5 corresponds to the second planet gear of FIGS. 1 and 3, and only the second and third planet gears of the multistage transmission shown in FIG. 5 are accommodated in a single housing. The same reference numerals have therefore been used in the following description for the same parts in the three embodiments.

The first planet gear, which is the same in all three embodiments, has a fixed transmission housing $H_1$, in which an input shaft $I_1$ and an output shaft $O_1$ are mounted in ball bearings 10,11. The output shaft $O_1$, which is hollow for most of its length, carries the input shaft $I_1$ inside it by means of another bearing in the form of a roller bearing 14. A planet wheel carrier 18 is fixed to a flange 16 at the front end of the output shaft $O_1$ by means of screws 20. A number of planet wheels 22, preferably three thereof, are mounted in this planet wheel carrier, distributed round the axis of the transmission. Each planet wheel 22 has three gearings 24, 26 and 28 of different diameters. The largest gearing 24 is formed by a separate gear wheel non-rotatably keyed to the middle gearing by means of a splined bore.

The largest gearing 24 meshes with a first central wheel 30 which consists of a relatively long internally geared sleeve which is non-rotatably connected to the input shaft $I_1$ by way of a gear disc 32. This central wheel 30 is also adapted to be connected by friction to the flange 16 of the output shaft $O_1$ by way of a direct clutch 34 in the form of a friction disc clutch which is operated by a servo motor 36 fixed to the housing, by way of a clutch sleeve 38 which rotates on the output shaft $O_1$ and is axially displaceable on it and by way of a number of radial clutch levers 40 with interposition of an axial thrust bearing 42 between the servo motor piston and the clutch sleeve.

In addition, inside the planet wheel carrier each of the gearings 24, 26, 28 meshes with an externally geared central wheel 44, 46, 48. The central wheels 44, 46 and 48 have relatively long hubs 50, 52 and 54 in the form of hollow shafts which are mounted at their other ends in or on non-rotatable inserts of the housing $H_1$ and equipped with brake discs in the form of flanges forming the internal hubs of friction disc brakes 56, 58, 60, which brakes are operated by servo motors 62, 64, 66 fixed to the housing. By mounting the hubs 50, 52, 54 of the central wheels at a considerable axial distance from their gearings, the central wheels 44, 46, 48 can freely adjust themselves in the radial direction to the gearings 24, 26 and 28 of the planet wheels 22.

The gearings 28 of smallest diameter of the planet wheels 22 also mesh with another internally geared central wheel 68 which is mounted to be self-adjusting on the planet wheels and forms the internal hub of another friction disc brake 70 which is operated by a servo motor 72 fixed to the housing.

The servo motors 62, 64, 66 and 72 are equipped with return springs (not shown) for the pistons while the servo motor 36 for the direct clutch has a cup spring 74 which not only serves to return the piston of the servo motor but also prevents loosening of the functional connection between the servo motor 36 and the direct clutch 34.

The servo motors 36, 62, 64, 66 and 72 can be selectively supplied with pressure oil from a source (not shown) of pressure oil. The following gear stages can thereby be switched on:

Servo motor 66 (central wheel 48): Largest forward reduction ratio (for example 2.52:1);
Servo motor 64 (friction disc 58): Middle forward reduction ratio (for example 1.87:1);
Servo motor 62 (friction disc 56): Smallest forward reduction ratio (for example 1.34:1);
Servo motor 36 (clutch 34): Direct transmission (1:1)
Servo motor 72 (central wheel 68): Reduction reversing gear (for example 1.2:1).

A housing $H_2$ for the second (FIGS. 1 and 3) or the second and third planet gear (FIG. 5) is flange connected to the rear end of the housing $H_1$.

The second gear shown in FIG. 1 is a so-called split gear in which the input shaft is formed by the output shaft $O_1$ of the first planet gear. The output shaft $O_2$ of the second planet gear is mounted in the housing $H_2$ by a ball bearing 76 and is also mounted on an extension 80 of the shaft $O_1$ by a roller bearing 78.

The second planet gear resembles the first planet gear in that its output shaft $O_2$ has a flange 82 at its front end, on which it carries a planet wheel carrier 84 which has preferably three planet wheels 86 distributed on its circumference round the axis of the transmission, which planet wheels have a front gearing 88 of smaller diameter and a rear gearing 90 of considerably larger diameter.

The front gearing 88 carries an internally geared central wheel 92 in the form of a sleeve which is non-rotatably connected by way of a geared disc 94 to the output shaft $O_1$ of the first planet gear, which output shaft forms the input member of the second planet gear.

A second, externally geared central wheel 94 is arranged within the planet wheel carrier 84 and meshes with the gearings 90 of larger diameter of the planet wheels 86. The second central wheel 94 has a relatively long hub which is mounted at its rear end in the transmission housing $H_2$ by means of a roller bearing 96. The external circumference of a brake disc 98 which is non-rotatably mounted on the hub of the central wheel 92 forms the internal hub of a friction disc brake 100 which is operated by a servo motor 102 fixed to the housing. The external circumference of another disc 104 fixed to the hub of the central wheel 92 forms the internal hub of a friction clutch 106 whose external hub 108 is fixed to the planet wheel carrier 84. The friction clutch 106 is engaged by means of a servo motor 110 fixed to the housing, which servo motor actuates the friction clutch 106 by way of an axial thrust bearing 112, a plurality of axially displaceable clutch tappets 114 extending through the brake disc 98, another axial thrust bearing 116 and a plurality of radial clutch levers 118. A cup spring 120 is provided for releasing the friction clutch 106 and returning the servo motor 110. The servo motor 102 of the friction disc brake 100 is returned by return springs (not shown) which act directly on the servo motor piston.

By engaging the friction clutch 106 by means of the servo motor 110, a direct connection is obtained between the output shaft $O_1$ of the first planet gear and the output shaft $O_2$ of the second planet gear, which second output shaft $O_2$ also serves as output shaft for the whole multistage transmission. The reduction ratios in forward and reversing gear as well as the direct transmission established by the first planet gear therefore apply unchanged to the whole multistage transmission. If, on the other hand, the friction clutch 106 is released and the central wheel 92 is fixed to the transmission housing $H_2$ by engaging the friction disc brake 108 by means of the servo motor 102, the second planet gear establishes a relatively low reduction ratio which further reduces the ratios of the first planet gear by half the step to the next lower gear. In this way, a total of eight forward gear stages are obtained, for example with the following reduction ratios:

| I. | Brakes 60 and 100 engaged: | 2.94:1 |
|---|---|---|
| II. | Brakes 50 and clutch 106 engaged: | 2.52:1 |
| III. | Brakes 58 and 100 engaged: | 2.81:1 |
| IV. | Brake 58 and clutch 106 engaged: | 1.87:1 |
| V. | Brakes 56 and 100 engaged: | 1.57:1 |
| VI. | Brake 56 and clutch 106 engaged: | 1.34:1 |
| VII. | Clutch 23 and brake 100 engaged: | 1.17:1 |

| VIII. | Clutches 34 and 106 engaged: | 1:1 (direct transmission). |
|---|---|---|

In addition, the reversing reduction ratio established by the first planet gear can be further reduced from 1.2:1 to approximately 1.4:1 by switching the second planet gear from direct transmission to reduction.

Figure 2:
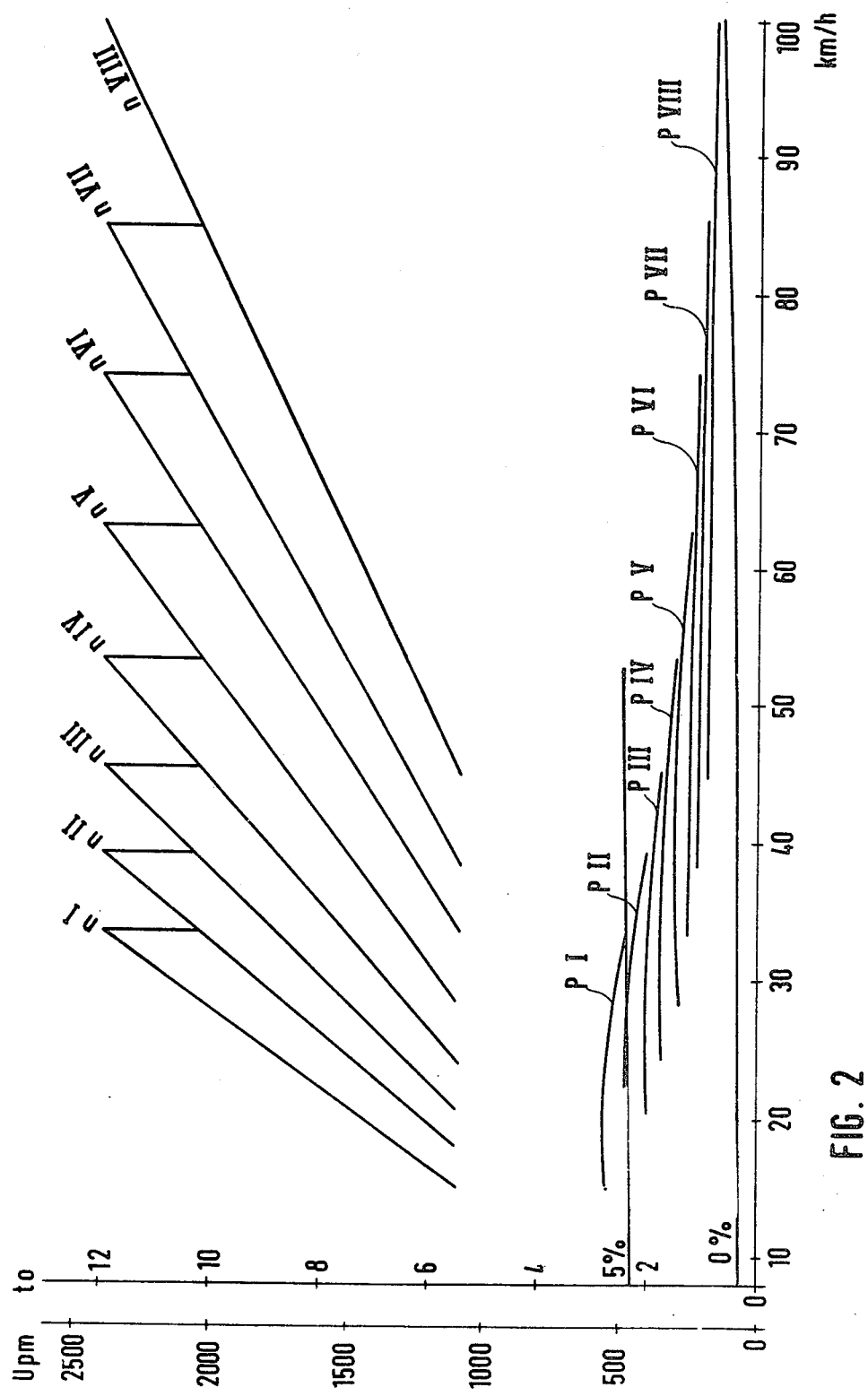
FIG. 2 is an operating diagram of this transmission used behind an internal combustion engine in a motor vehicle, with the input speed of the transmission and the torque at the transmission output shaft entered above the travelling speed.

In FIG. 2, the straight lines $n_I$ to $n_{VIII}$ passing through the zero coordinate of the diagram represent the relationship between the speed of the internal combustion engine at the input of the transmission and the travelling velocity while the vertical lines entered between them show how the individual gears can be changed to avoid exceeding the maximum permissible engine speed. In addition, the curves $P_I$-$P_{VIII}$ represent the variation in torque at the output shaft $O_2$ and hence the traction power of the vehicle in the different gears.

The multipurpose transmission illustrated in FIG. 3 differs from that shown in FIG. 1 in that the second planet gear within its housing $H_2$ is a so-called range gear. The second planet gear of FIG. 3 has an input shaft $I_2$ which is an extension of the output shaft $O_1$ of the first planet gear and is mounted inside the output shaft $O'_2$ of its planet gear by means of a roller bearing 122, while the output shaft $O'_2$ is mounted in the housing $H_2$ of this transmission by means of a ball bearing 124. The output shaft $O'_2$ of the planet gear of FIG. 3 differs from the output shaft of the second planet gear of FIG. 1 in being much shorter and having a flange disc 126 mounted on it by means of a multigroove connection, with a forwardly extending planet wheel carrier 128 fixed to this flange disc 126. A number of planet wheels 130, preferably three thereof, having two gearings 132 and 134 of differing diameters are mounted on the planet wheel carrier 128. The front gearings 132 are formed by separate gear wheels non-rotatably seated on the planet wheels 130.

An externally geared central wheel 136 is non-rotatably mounted on the input shaft $I'_2$ and meshes inside the planet wheel carrier with the larger gearings 132 of the planet wheels 130. An internally geared central wheel 138 meshes on the outside of the planet wheel carrier 128 with the larger gearings 132 of the planet wheels 130 and forms the internal hub of a friction disc brake 140 which is engaged by means of a servo motor 142 fixed to the housing. Another internally geared central wheel 144 encloses the smaller gearings 134 of the planet wheels 130 with some radial clearance and is functionally connected to them through intermediate gear wheels (not shown). The central wheel 144 forms the internal hub of another friction disc brake 146 which is designed to be engaged by a servo motor 148 fixed to the housing. Both internally geared central wheels 138 and 144 are centered solely by their intermeshing with the teeth of the planet wheel 132 or of the intermediate gear wheels (not shown).

A hub 150 in the form of a collar is attached to the planet wheel carrier by a flange and forms the internal hub of a friction disc clutch 152 whose external hub is formed by a collar attachment of the internally geared central wheel 138. The friction disc clutch 152 is engaged by means of a servo motor 154 fixed to the housing, which servo motor operates the friction disc clutch 152 by way of an axial thrust bearing 156, a thrust ring 158 and a plurality of radial clutch levers 160. A cup spring 162 is provided for releasing the friction disc clutch 152. The pistons of the servo motors 142 and 148 are returned by means of helical compression springs (not shown).

When the friction disc clutch 152 is engaged, the second planet gear of FIG. 3 transmits the rotation of the output shaft $O_1$ of the first planet gear directly to the output shaft $O'_2$ of the second planet gear, which second output shaft also constitutes the output shaft of the whole multistage transmission. If, on the other hand, the clutch 152 is released and, instead, the friction disc brake 140 is engaged by means of the servo motor 142, then the central wheel 138 is fixed and the output shaft $O'_2$ of the second planet gear rotates in the same sense as the output shaft $O_1$ of the first planet gear but at a substantially lower velocity. The diameter of the planet wheel gearing 132 is chosen in proportion to the axial distance between the planet wheels 130 and the transmission axis so that when the friction disc brake 140 is engaged, the reduction ratio of the second planet gear is greater than the greatest reduction ratio of the first planet gear. As an example, the reduction ratio of the second planet gear may be 2.94:1 and therefore provides for the whole multistage transmission a second group of gears with substantially higher reduction ratios than those provided by the four forward gears of the first planet gear. One thereby obtains a total of eight gears, for example with the following reduction ratios in the forward direction:

| I | Brakes 60 and 140 engaged: | 8.73:1 |
|---|---|---|
| II. | Brakes 58 and 140 engaged: | 6.47:1 |
| III. | Brakes 56 and 140 engaged: | 4.66:1 |
| IV. | Clutch 34 and brake 140 engaged: | 3.47:1 |
| V. | Brake 60 and clutch 152 engaged: | 2.52:1 |
| VI. | Brake 58 and clutch 152 engaged: | 1.87:1 |
| VII. | Brake 56 and clutch 152 engaged: | 1.34:1 |
| VIII. | Clutches 34 and 152 engaged: | 1:1 (direct transmission). |

In addition, two reduced reverse gears with reduction ratios of 1.2:1 and 3.5:1 can be switched on by engaging the brake 70 in the first planet gear and selectively the clutch 152 or the brake 140 in the second planet gear. However, these ratios would in many cases be insufficient compared with a forward reduction ratio of 8.73 in the first gear. This defect can be overcome by engaging the friction disc brake 146 of the second planet gear by means of the servo motor 154 in combination with any forward reduction ratios of the first planet gear instead of engaging the friction disc brake 140 or the friction disc clutch 152. In this way, the second planet gear is able to supply a reversing reduction ratio of, for example, 4.58:1 which is superimposed on and multiplies the reduction ratios of the first planet gear. If in this case the central wheel 48 of the first planet gear is braked, the maximum reduction ratio obtainable for reversing is 11.53:1.

Figure 4:
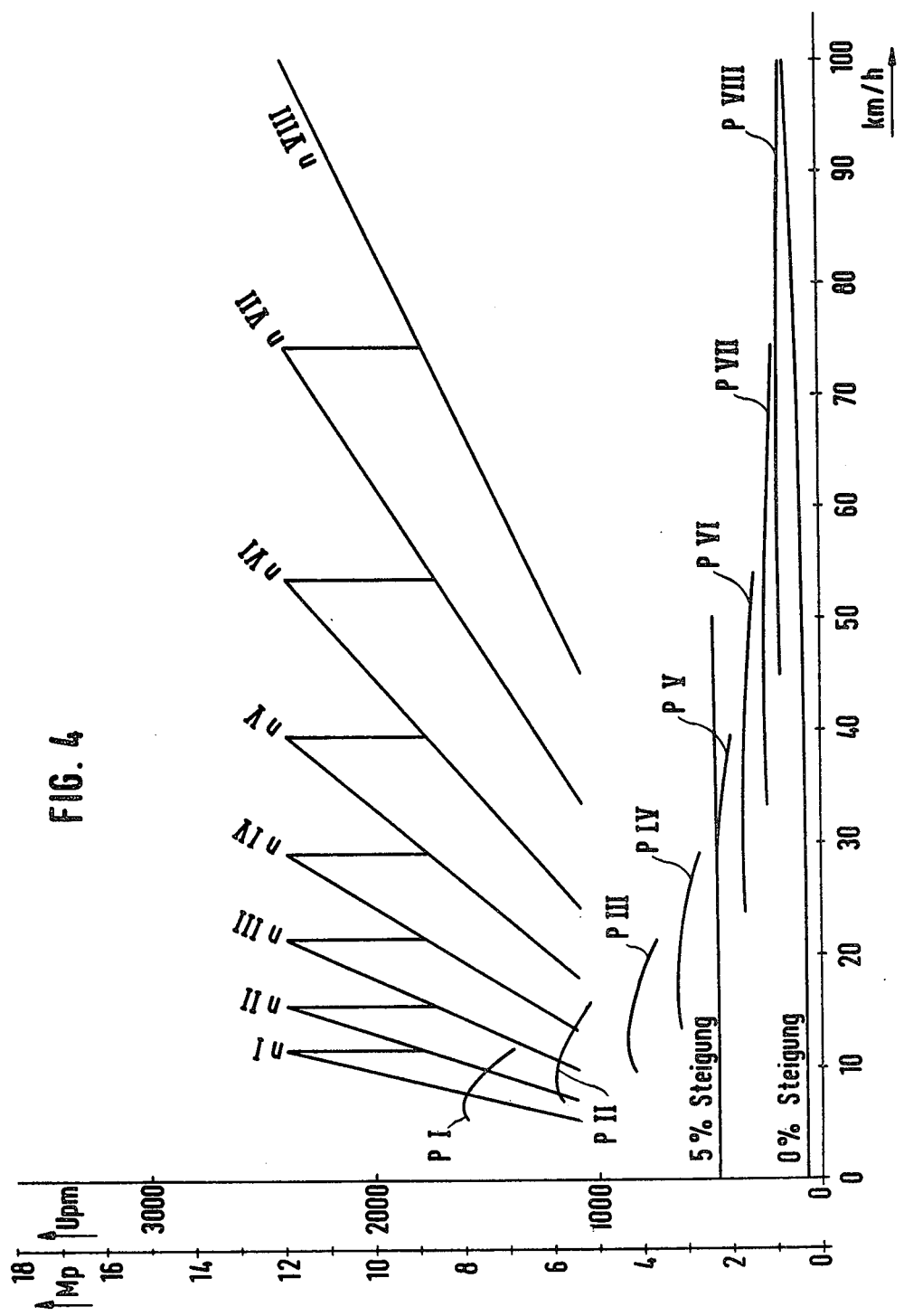
FIG. 4 is a diagram similar to that of FIG. 2 for the transmission according to FIG. 3.

The graphs in FIG. 4 illustrate, similarly to the graphs of FIG. 2, the relationships between the input speeds $n_I$ to $n_{VIII}$ and the traction power of the vehicle $P_I$-$P_{VIII}$ in the various forward gears when the transmission according to FIG. 3 is used in a motor vehicle driven by an internal combustion engine.

In the multistage transmission shown in FIG. 5, three planet gears are arranged one behind the other, as already mentioned. The first of these gears corresponds to the first planet gear of FIGS. 1 and 3, the second planet gear is a split gear like that of FIG. 3 while the third planet gear corresponds to the second planet gear of FIG. 5 which is constructed as a range gear. Apart from the fact that the second and third planet gear are arranged inside a common housing H"$_2$ and that the output shaft of the second planet gear is combined with the input shaft of the third planet gear to form an intermediate shaft Z, the second and third planet gear are identical in construction to the second planet gear of FIGS. 1 and 3.

The multistage transmission of FIG. 5 can be switched into sixteen forward gears which may, for example, provide the following reduction ratios when the appropriate brakes and clutches are engaged:

| | | |
|---|---|---|
| I. | Brakes 60, 100 and 140 engaged: | 10.19:1 |
| II. | Brakes 60, 140 and clutch 106 engaged: | 8.73:1 |
| III. | Brakes 58, 100 and 140 engaged: | 7.54:1 |
| IV. | Brakes 58, 152 and clutch 106 engaged: | 6.47:1 |
| V. | Brakes 56, 100 and 152 engaged: | 5.44:1 |
| VI. | Brakes 56, 140 and clutch 106 engaged: | 4.66:1 |
| VII. | Clutch 34 and brakes 100, 140 engaged: | 4.04:1 |
| VIII. | Clutches 34, 106 and brake 140 engaged: | 3.47:1 |
| IX. | Brakes 60, 100 and clutch 152 engaged: | 2.94:1 |
| X. | Brake 60 and clutches 106, 152 engaged: | 2.52:1 |
| XI. | Brakes 58, 100 and clutch 152 engaged: | 2.18:1 |
| XII. | Brake 58 and clutches 106, 152 engaged: | 1.87:1 |
| XIII. | Brakes 56, 100 and clutch 152 engaged: | 1.57:1 |
| XIV. | Brake 56 and clutches 106, 152 engaged: | 1.34:1 |
| XV. | Clutches 34, 152 and brake 100 engaged: | 1.17:1 |
| XVI. | Clutches 34, 106 and 152 engaged: | 1:1 (direct transmission). |

The conditions for reversing are similar to those in the multistage transmission of FIG. 3 but the reduction ratios can be even further reduced by a factor of 1.17 by engaging the brake 100 in the second planet gear.

Figure 6:
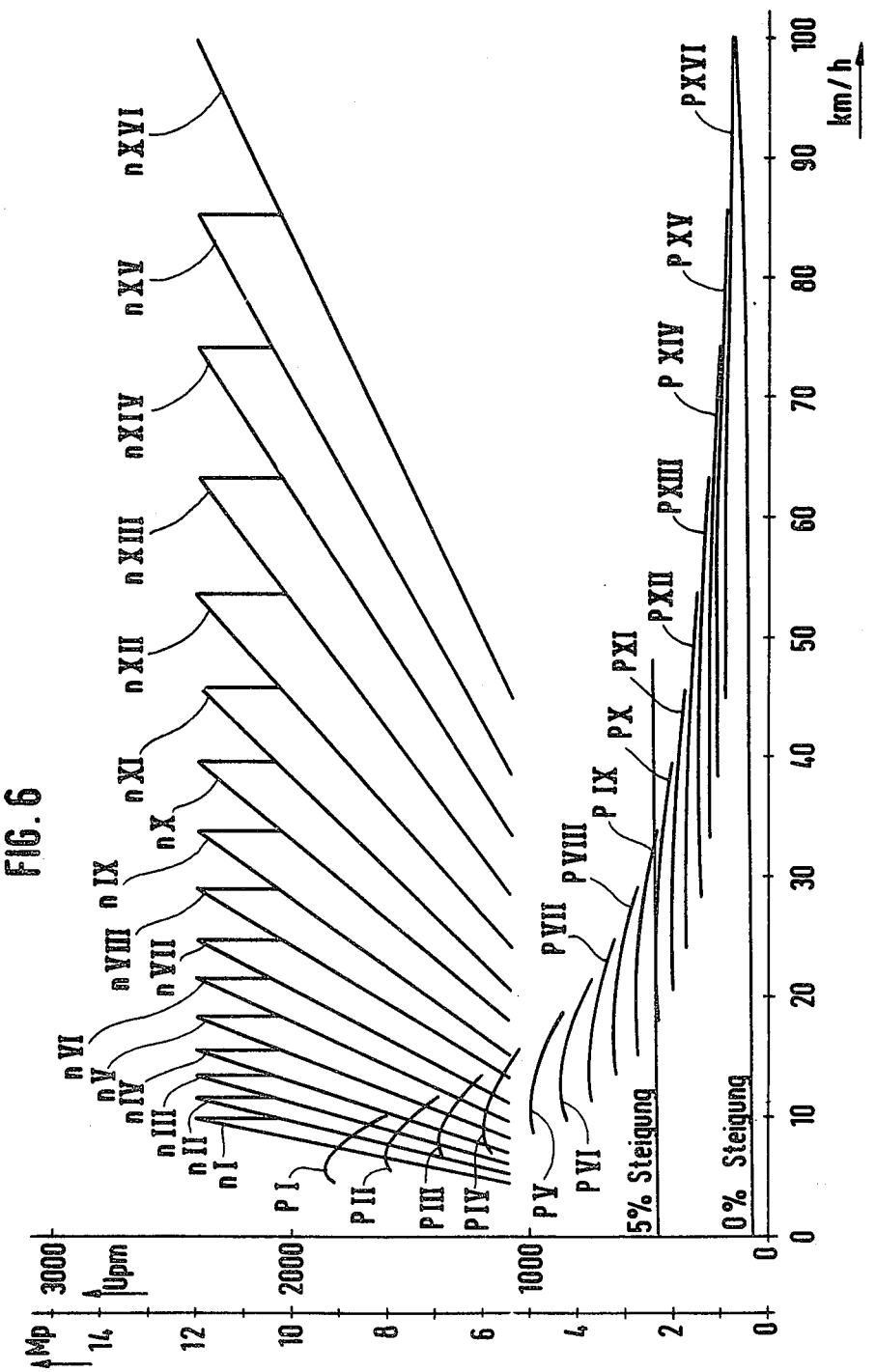
FIG. 6 is an operating diagram for the transmission according to FIG. 5, similar to the diagrams corresponding to FIGS. 2 and 4.

The diagram in FIG. 6 again shows the relationship between the input speeds $n_I$ to $n_{XVI}$ and the traction forces $P_I$ to $P_{XVI}$ in dependence upon the travelling velocities in the various gears of the transmission illustrated in FIG. 5.

Figure 7:
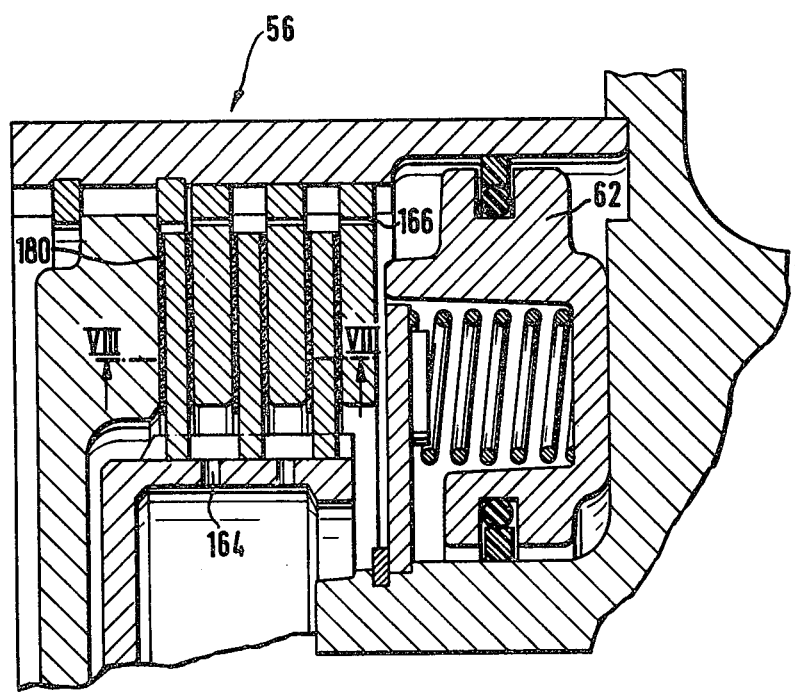
FIG. 7 is a diagram on an enlarged scale of a portion of FIG. 1, showing one of the friction disc brakes and the corresponding servo motor.

It will be clear from the description given above that all the central wheels are freely adjustable in relation to the teeth on the gearings of the corresponding planet wheels by virtue of being mounted at a considerable axial distance from the zone of intermeshing of the teeth or having no special mounting means at all. The losses at the points of engagement of the teeth are thereby reduced to a minimum. It can also be seen from the example of the friction disc 56 of FIGS. 7 and 8 that the multigroove connections with which the friction discs are mounted on or in their hubs fixes them against rotation but leaves them free to displace in the axial direction so that when disengaged they can separate from each other without contact. This separation is particularly assisted at higher speeds of rotation by providing the internal hubs of the friction disc brakes and the friction disc clutches with axial air channels 164 for sending a stream of air between the friction discs and by providing perforations 166 in the externally mounted friction discs, in a position radially outside their zone of engagement, so that the air stream between the friction discs can leave through these perforations and return to the channels 164.

Figure 8:
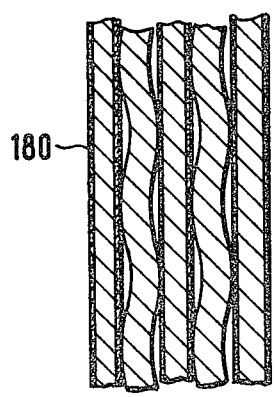
FIG. 8 is a longitudinal section coaxial with the axis of the transmission, taken on the line VIII—VIII of FIG. 7 and passing through the friction discs of this brake.

The friction discs of one half of each brake or clutch are preferably made of steel and, as shown in FIG. 8, with a sinusoidal undulation of small amplitude in the circumferential direction, while the friction discs of the other half of each brake or clutch are plane and may be covered with sintered metal linings 180.

The air suspension thereby obtained between the friction discs is virtually negligible compared with the hydraulic friction normally produced when friction disc brakes and clutches are lubricated with oil.

It will be obvious that this so-called lubrication with air is all the more effective the higher the speed of rotation of the internal hub and the more powerful the stream of air between the friction discs. In order to ensure efficient lubrication between the friction discs even at low speeds of the internal hubs, means for distributing small quantities of oil in the space between the friction discs as well as to the teeth of the planet wheels and their bearings as well as the bearings of the central hubs may be provided. According to FIG. 1, pressure oil is delivered for this purpose into the interior of the hollow central shafts of the planet gear, for example from the supply pump for the servo motors, by way of a pressure oil connection 168, and from the interior of the central shafts it is carried in small quantities through the radial bores 170 in the central shafts and in the other shafts and hubs coaxially surrounding them, and sprayed on the parts which are to be lubricated.

What we claim is:

1. A multi-speed transmission comprising at least two planetary gear sets arranged in series with an output from a first gear set operatively connected to an input of the second gear set, the first planetary gear set comprising a plurality of planetary pinions spaced around the axis of the first planetary gear set, each planetary pinion having at least three different gearing diameters, the input to the transmission operatively connected to a ring gear which is operatively engaged with the largest diameter gearing of the said planetary pinions, a carrier mounting said planetary pinions, the carrier being the output from said first planetary gear set, a separate sun gear operatively engaged with each of said gearing diameters, each of said sun gears having a brake for releasing its sun gear or braking it against rotation about its axis, a direct drive clutch for engaging the input ring gear with the output carrier, the second planetary gear set having an input sun gear connected to the output of the first planetary gear set, a plurality of planetary pinions spaced around the axis of the second planetary gear set, said input sun gear connected to the said planetary pinions of the second planetary gear set, a carrier mounting said planetary pinions of the second planetary gear set, said carrier being the output from said second planetary gear set, a direct drive clutch operatively engaging the said input sun gear with the output carrier for direct drive, a ring gear operatively engaged with the planetary pinions and having a brake for releasing the ring gear or preventing it from rotating about its axis for speed reduction through the second planetary gear set, the speed reduction ratio provided by braking the ring gear in the second planetary gear set being greater than the greatest speed reduction ratio provided by the first planetary gear set, such that braking the ring gear of the second planetary gear set moves the speed reduction ratios of the whole transmission to an entirely different range than those provided when the direct drive clutch of the second planetary gear set is engaged for direct drive therethrough.

2. A transmission according to claim 1, said transmission further including a reverse gear.

3. A transmission according to claim 2, said reverse gear being in said first planetary gear set.

4. A transmission according to claim 2, said reverse gear being in said second planetary gear set.

5. A transmission according to claim 1, said first planetary gear set having a reverse ring gear operatively engaged with one of the said planetary pinion gearing diameters other than the largest gearing diameter, a brake for braking said reverse ring gear for reverse drive through the first planetary gear set.

6. A transmission according to claim 5, said reverse ring gear engaged with the smallest gearing diameter of the first planetary gear set.

7. A multi-speed transmission comprising at least two planetary gear sets arranged in series with the outlet from first gear set operatively connected to input of the second gear set, one of the planetary gear sets comprising a plurality of planetary pinions spaced around the axis of the one planetary gear set, each planetary pinion having at least three different gearing diameters, the input to the said one planetary gear set operatively connected to a ring gear which is operatively engaged with the largest diameter gearing of said planetary pinions, a carrier mounting said planetary pinions, the carrier being the output from said one planetary gear set, a separate sun gear operatively engaged with each of said gearing diameters, each of said sun gears having a brake for releasing its sun gear or braking it against rotation about its axis, a direct drive clutch for engaging the input ring gear and the output carrier together for direct drive, another planetary gear set having an input ring gear, a plurality of planetary pinions spaced around the axis of the said other planetary gear set, said planetary pinions having at least two gearing diameters, said input ring gear operatively engaged with the smallest gearing diameter, a carrier mounting said planetary pinions of the said other planetary gear set, said carrier being the output from said other planetary gear set, a direct drive clutch for operatively engaging together the input ring gear and the output carrier of the said other planetary gear set for direct drive, a sun gear operatively engaged with the largest diameter gearing, a brake for braking the said sun gear against rotation about its axis, the speed reduction ratio through the said other planetary gear set provided by braking the said sun gear being intermediate between the speed reduction steps provided by said one planetary gear set, such that braking the sun gear of the said other planetary gear set splits the said speed reduction steps of the said one planetary gear set into two speed reduction steps.

8. A transmission according to claim 7, wherein the carrier of said one planetary gear set is operatively engaged with the input ring gear of the said other planetary gear set.

9. A transmission according to claim 7 or claim 8, said transmission further including a reverse gear.

10. A transmission according to claim 9, said reverse gear being in said one planetary gear set.

11. A transmission according to claim 7, said one planetary gear set having a reverse ring gear operatively engaged with one of the said planetary pinion gearing diameters other than the largest gearing diameter, a brake for braking said reverse ring gear for reverse drive through the said one planetary gear set.

12. A transmission according to claim 7, including in said series a further planetary gear set having an input sun gear, a plurality of planetary pinions spaced around the axis of the said further planetary gear set, said input sun gear connected to the said planetary pinions of the said further planetary gear set, a carrier mounting said planetary pinions of the said further planetary gear set, said carrier being the output from said further planetary gear set, a direct drive clutch for operatively engaging said input sun gear with the output carrier for direct drive, a ring gear operatively engaged with the planetary pinions and having a brake for releasing the ring gear or preventing it from rotating about its axis for speed reduction through the said further planetary gear set, the speed reduction ratio provided by braking the ring gear in the said further planetary gear set being greater than the greatest speed reduction ratio provided by the said one planetary gear set, such that braking the ring gear of the said further planetary gear set moves the speed reduction ratio of the whole transmission to an entirely different range than the range provided when the direct drive clutch of the said further planetary gear set is engaged.

13. A transmission according to claim 12, wherein said further planetary gear set is the last planetary gear set in the series of the three sets.

14. A transmission according to claim 13, said transmission including a reverse gear.

15. A transmission according to claim 14, said reverse gear being in said one planetary gear set.

16. A transmission according to claim 14, said reverse gear being in said further planetary gear set.

17. A transmission according to claim 12 or claim 13, said one planetary gear set having a reverse ring gear operatively engaged with one of said planetary pinion gearing diameters other than the largest gearing diameter, a brake for braking said reverse ring gear for reverse drive through the said one planetary gear set.

18. A multi-speed transmission having at least three planetary gear sets arranged in series with an output from the first planetary gear set operatively connected to an input of the second planetary gear set and the output of an second planetary gear set being connected to the input of an third planetary gear set, including:

a main planetary gear set comprising a plurality of planetary pinions spaced around the axis of the main planetary gear set, each planetary pinion having at least three different gearing diameters, the input to the main planetary gear set operatively connected to a ring gear which is operatively engaged with the largest diameter gearing of said planetary pinions, a carrier mounting said planetary pinions, the carrier being the output from the said main planetary gear set, separate sun gears operatively engaged with at least two of said gearing diameters, each of said sun gears having a brake for releasing its sun gear or braking it against rotation about its axis, a direct drive clutch for engaging the input ring gear with the output carrier, a range planetary gear set having an input sun gear, a plurality of planetary pinions spaced around the axis of the said range planetary gear set, said input sun gear connected to the planetary pinions of the range planetary gear set, a carrier mounting said planetary pinions of the range planetary gear set, said carrier being the output from said range planetary gear set, a direct drive clutch for operatively engaging the said input sun gear with the output carrier for direct drive, a ring gear operatively engaged with the planetary pinions and having a brake for releasing the ring gear or preventing it from rotating about its axis for speed reduction through the range planetary gear set, the speed reduction ratio provided by braking the ring gear in the range planetary gear set being greater than the greatest speed reduction ratio provided by the main planetary gear set, such that braking the ring gear of the range planetary gear set moves the speed reduction ratios of the whole transmission to an entirely different range than those provided when the direct drive clutch of the range planetary gear set is engaged for direct drive therethrough, and a split planetary gear set having an input ring gear, a plurality of planetary pinions spaced around the axis of said split planetary gear set, said planetary pinions having at least two gearing diameters, the input ring gear operatively engaged with the smallest gearing diameter, a carrier mounting the planetary pinions of the said split planetary gear set, said carrier comprising the output from the said split planetary gear set, a direct drive clutch for operatively engaging together the input ring gear and the output carrier of the said split planetary gear set for direct drive, a sun gear operatively engaged with the largest diameter gearing, a brake for braking the said sun gear against rotation about its axis, the speed reduction ratio through said split planetary gear set provided by braking the said sun gear being intermediate between the speed reduction steps provided by said main planetary gear set, such that braking the sun gear of the said split planetary gear set splits the said speed reduction of each step of the said main planetary gear set into two speed reduction steps.

19. A transmission according to claim 18, wherein the main planetary gear set has three gearing diameters on its planetary pinions.

20. A transmission according to claim 18, wherein the range planetary gear set is last in the series.

21. A transmission according to any one of claims 18, 19, or 20, wherein the transmission has a reverse gear.

22. A transmission according to claim 21, wherein the reverse gear is in the main planetary gear set.

23. A transmission according to claim 21, wherein the reverse gear is in the range planetary gear set.

24. A transmission according to claim 18 or claim 19, wherein the three planetary gear sets are in the order of main, split and then range planetary gear sets, respectively.

* * * * *